United States Patent
Ahn et al.

(10) Patent No.: US 10,145,759 B2
(45) Date of Patent: Dec. 4, 2018

(54) APPARATUS FOR ESTIMATING OSCILLATION WITHIN COMBUSTION DEVICE

(71) Applicant: DOOSAN HEAVY INDUSTRIES & CONSTRUCTION CO., LTD., Changwon-si, Gyeongsangnam-do (KR)

(72) Inventors: Sung Jong Ahn, Yongin-si (KR); Jin Woong Ha, Daejeon (KR); Young Ho Ju, Changwon-si (KR); Cheol Hong Kim, Changwon-si (KR)

(73) Assignee: DOOSAN HEAVY INDUSTRIES & CONSTRUCTION CO., LTD., Changwon-si (KR)

( * ) Notice: Subject to any disclaimer, the term of this patent is extended or adjusted under 35 U.S.C. 154(b) by 574 days.

(21) Appl. No.: 14/488,962

(22) Filed: Sep. 17, 2014

(65) Prior Publication Data
US 2015/0081233 A1    Mar. 19, 2015

(30) Foreign Application Priority Data

Sep. 17, 2013    (KR) ......................... 10-2013-0112049

(51) Int. Cl.
*G01M 15/12* (2006.01)
*G01K 13/04* (2006.01)
(Continued)

(52) U.S. Cl.
CPC .......... *G01M 15/12* (2013.01); *F23M 20/005* (2015.01); *F23N 5/242* (2013.01);
(Continued)

(58) Field of Classification Search
CPC .............. F23M 20/005; F23N 2025/04; F23N 2025/16; F23N 2029/20; F23N 5/242; G01K 13/04; G01L 9/00; G01M 15/12
(Continued)

(56) References Cited

U.S. PATENT DOCUMENTS

| 2004/0123653 A1* | 7/2004 | Benson | F23N 1/022 |
| | | | 73/114.12 |
| 2008/0307703 A1* | 12/2008 | Dietenberger | C10J 3/463 |
| | | | 48/76 |

(Continued)

FOREIGN PATENT DOCUMENTS

| JP | H08210635 A | 8/1996 |
| JP | 2004092402 A | 3/2004 |

OTHER PUBLICATIONS

Application of Transfer Matrix Method in Acoustics, G. Campa et al., Excerpt from the Proceedings of the COMSOL Conference 2010 Paris.*

(Continued)

*Primary Examiner* — John H Le
(74) *Attorney, Agent, or Firm* — Sughrue Mion, PLLC

(57) ABSTRACT

Disclosed herein is a combustion oscillation estimating apparatus which estimates combustion oscillation in a combustion chamber connected with a burner so that a flame is injected by the burner, the combustion oscillation estimating apparatus including an input unit which receives data including an inlet pressure of the burner, and a control unit which detects a pressure in the combustion chamber based on a shape from the burner to the combustion chamber, a temperature distribution in the combustion chamber, and a shape of the flame. The combustion oscillation estimating apparatus may improve estimation accuracy of the combustion oscillation in the combustion chamber.

20 Claims, 4 Drawing Sheets

(51) Int. Cl.
*G01L 9/00* (2006.01)
*F23N 5/24* (2006.01)
*F23M 20/00* (2014.01)

(52) U.S. Cl.
CPC ............... *G01K 13/04* (2013.01); *G01L 9/00* (2013.01); *F23N 2025/04* (2013.01); *F23N 2025/16* (2013.01); *F23N 2029/20* (2013.01)

(58) Field of Classification Search
USPC ...... 702/44, 56, 98, 105, 136, 138; 123/143; 431/8, 13, 75; 73/114.12
See application file for complete search history.

(56) References Cited

U.S. PATENT DOCUMENTS

| | | | | |
|---|---|---|---|---|
| 2012/0196234 A1* | 8/2012 | Bulat | ..................... | F02C 9/28 431/13 |
| 2014/0318489 A1* | 10/2014 | Ben-Haim | ............ | F23C 99/001 123/143 R |

OTHER PUBLICATIONS

Japanese Office Action; Application No. 2014-188402; dated Jun. 26, 2018.

* cited by examiner

APPARATUS FOR ESTIMATING OSCILLATION WITHIN COMBUSTION DEVICE

CROSS-REFERENCE(S) TO RELATED APPLICATIONS

This application claims priority to Korean Patent Application No. 10-2013-0112049, filed on Sep. 17, 2013, the disclosure of which is incorporated herein by reference in its entirety.

BACKGROUND OF THE INVENTION

Field of the Invention

Exemplary embodiments of the present invention relate to an apparatus for estimating oscillation within combustion device, and more particularly, to an apparatus for estimating oscillation generated during injection of flames in a combustion chamber.

Description of the Related Art

A generating apparatus such as a boiler using fuel includes a combustion device. The combustion device generally includes a burner in which fuel and air are mixed and a combustion chamber connected to the burner, so as to supply heat to the boiler.

Oscillation is generated during injection of flames by the burner within the combustion chamber, and the oscillation is typically referred to as "combustion oscillation". An acoustic resonance is generated when an acoustic frequency of combustion oscillation generated in the combustion chamber coincides with an acoustic frequency of a space within the combustion chamber, and there is concern that this resonance and thermoacoustic instability damage structures of the boiler including the combustion chamber. Accordingly, a conventional method estimates acoustic characteristics during combustion oscillation in the combustion chamber through thermoacoustic analysis models.

One of conventional thermoacoustic analysis models is a model which estimates the resonance and thermoacoustic instability by assuming a shape of the combustion chamber as a Sondhauss and Rijke tube and simplifying a boundary condition.

However, since the conventional thermoacoustic analysis model assumed as the Sondhauss and Rijke tube estimates resonance status by utilizing only information of a tube length and representative temperatures in a cold zone and a hot zone, there is a problem in that critical errors occur between an actual experiment result and an estimation result.

In addition, the conventional thermoacoustic analysis models determine only the frequency of combustion oscillation in the combustion chamber. Thus, the conventional models have a problem of separately utilizing an experimental instability curve such as a Rott curve in order to estimate thermoacoustic instability in the combustion chamber.

Moreover, there is a problem in that the conventional thermoacoustic analysis models are able to analyze only one burner when estimating combustion oscillation in the combustion chamber having a plurality of burners.

SUMMARY OF THE INVENTION

An object of the present invention is to provide a combustion oscillation estimating apparatus capable of improving estimation accuracy of combustion oscillation in a combustion chamber.

Another object of the present invention is to provide a combustion oscillation estimating apparatus capable of estimating combustion oscillation frequencies in a combustion chamber together with thermoacoustic instability.

A further object of the present invention is to provide a combustion oscillation estimating apparatus capable of simultaneously estimating combustion oscillation in a combustion chamber connected with a plurality of burners.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, a combustion oscillation estimating apparatus, which estimates combustion oscillation in a combustion chamber connected with a burner so that a flame is injected by the burner, includes an input unit which receives data including an inlet pressure of the burner, and a control unit which detects a pressure in the combustion chamber based on a shape from the burner to the combustion chamber, a temperature distribution in the combustion chamber, and a shape of the flame.

The data may include at least one of the shape-related data from the burner to the combustion chamber, the temperature distribution-related data in the combustion chamber, and the shape-related data of the flame.

The control unit may detect a pressure in the combustion chamber using a transfer matrix having an eigenvalue calculated based on one of shape-related data from the burner to the combustion chamber, temperature distribution-related data in the combustion chamber, and shape-related data of the flame.

The shape-related data from the burner to the combustion chamber may also include at least one of shape-related data of the burner, shape change-related data of a connection portion between the burner and the combustion chamber, and shape-related data of the combustion chamber.

The control unit may detect a pressure in the combustion chamber using a global matrix made by setting a burner shape transfer matrix based on the shape-related data of the burner, a shape change transfer matrix based on the shape change-related data of the connection portion between the burner and the combustion chamber, a combustion chamber shape transfer matrix based on the shape-related data of the combustion chamber, a temperature distribution transfer matrix based on the temperature distribution-related data in the combustion chamber, and a flame shape transfer matrix based on the shape-related data of the flame, as diagonal elements.

The global matrix may be a matrix made by summing the burner shape transfer matrix, the shape change transfer matrix, the temperature distribution transfer matrix, the flame shape transfer matrix, and the combustion chamber shape transfer matrix in the listed order.

The shape change-related data of a connection portion between the burner and the combustion chamber may include a ratio between a cross-sectional area at an outlet end of the burner and a cross-sectional area of the combustion chamber.

The temperature distribution-related data in the combustion chamber may include a temperature gradient in the combustion chamber. In this case, the temperature gradient may be calculated through a CFD (Computational Fluid Dynamics).

The shape-related data of the flame may be based on a plurality of flame surfaces derived along a longitudinal direction of the flame.

The combustion oscillation estimating apparatus may further include a storage unit for storing at least one of the transfer matrices and the global matrix.

In accordance with another aspect of the present invention, a combustion oscillation estimating apparatus, which estimates combustion oscillation in a combustion chamber connected with a plurality of burners so that flames are respectively injected by the burners, includes an input unit which receives data including inlet pressures of the plural burners, and a control unit which detects a pressure in the combustion chamber based on a shape from the plural burners to the combustion chamber, a temperature distribution in the combustion chamber, and a shape of each of the flames.

The control unit may detect a pressure in the combustion chamber using a transfer matrix having an eigenvalue calculated based on one of shape-related data from each of the plural burners to the combustion chamber, temperature distribution-related data in the combustion chamber, and shape-related data of the flame injected into the combustion chamber by the associated burner.

The control unit may detect a pressure in the combustion chamber using a global matrix made by setting transfer matrices based on data corresponding to a plurality of positions divided from one burner via the combustion chamber to another burner as diagonal elements.

The plural burners may include a first burner and a second burner which face each other and are each connected to the combustion chamber.

The global matrix may be a matrix made by summing a first burner shape transfer matrix based on shape-related data of the first burner, a first shape change transfer matrix based on shape change-related data of a connection portion between the first burner and the combustion chamber, a first temperature distribution transfer matrix based on the temperature distribution-related data in the combustion chamber by the flame injected by the first burner, a first flame shape transfer matrix based on the shape-related data of the flame injected by the first burner, a combustion chamber shape transfer matrix based on the shape-related data of the combustion chamber, a second flame shape transfer matrix based on the shape-related data of the flame injected by the second burner, a second temperature distribution transfer matrix based on the temperature distribution-related data in the combustion chamber by the flame injected by the second burner, a second shape change transfer matrix based on shape change-related data of a connection portion between the second burner and the combustion chamber, and a second burner shape transfer matrix based on shape-related data of the second burner, in the listed order.

The shape change-related data of the connection portion between the first or second burner and the combustion chamber may include a ratio between a cross-sectional area at an outlet end of the first or second burner and a cross-sectional area of the combustion chamber, the temperature distribution-related data in the combustion chamber by the flame injected by the first or second burner may include a temperature gradient in the combustion chamber, and the shape-related data of the flame injected by the first or second burner may be based on a plurality of flame surfaces derived along a longitudinal direction of the associated flame.

In accordance with a further aspect of the present invention, a combustion oscillation estimating method includes receiving data by an input unit included in a combustion oscillation estimating apparatus, and detecting a pressure in a combustion chamber based on the data by control unit included in a combustion oscillation estimating apparatus.

The data may include at least one of shape-related data from the burner to the combustion chamber, temperature distribution-related data in the combustion chamber, and shape-related data of a flame.

The detecting a pressure in a combustion chamber may include calculating an eigenvalue of a transfer matrix based on the data by the control unit.

The calculating an eigenvalue of a transfer matrix may calculate the eigenvalue of the transfer matrix for each data.

The detecting a pressure in a combustion chamber may further include calculating a global matrix by summing a plurality of transfer matrices calculated for each data by the control unit, and analyzing an eigenvalue problem with respect to the global matrix by the control unit.

The calculating a global matrix diagonally may arrange the plural transfer matrices according to data on which the transfer matrices are based so as to sum them, and sequentially arrange, according to a sequential position from the burner to the combustion chamber, the transfer matrices based on data corresponding to the position.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

Reference will now be made in detail to the exemplary embodiments of the present invention, examples of which are illustrated in the accompanying drawings. However, if it is determined that detailed description of known relevant technologies may unnecessarily obscure the gist of the present invention in the description thereof, the detailed description thereof will be omitted.

Figure 1:
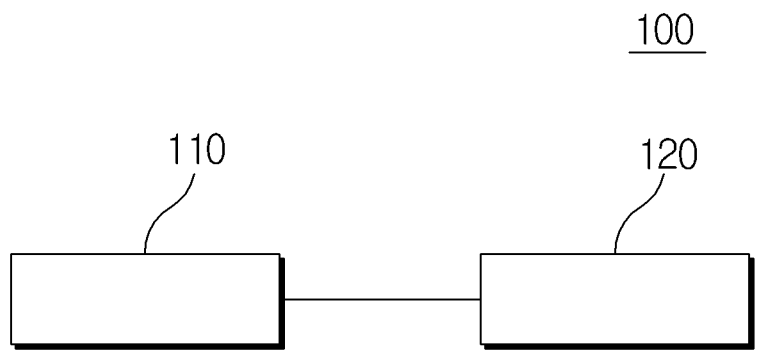
FIG. 1 is a block diagram illustrating a combustion oscillation estimating apparatus according to an embodiment of the present invention.
Figure 2:
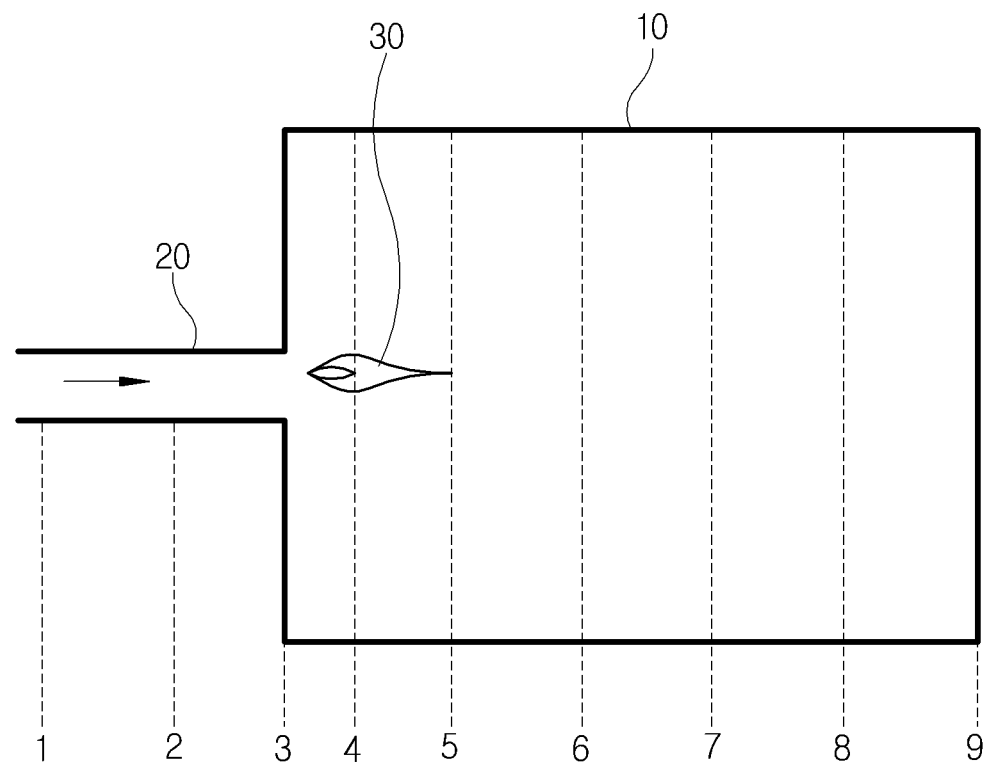
FIG. 2 is a conceptual diagram illustrating a burner and a combustion chamber to which the embodiment shown in FIG. 1 is applicable.

FIG. 1 is a block diagram illustrating a combustion oscillation estimating apparatus according to an embodiment of the present invention. FIG. 2 is a conceptual diagram illustrating a burner and a combustion chamber to which the embodiment shown in FIG. 1 is applicable. Hereinafter, a combustion oscillation estimating apparatus according to an embodiment of the present invention will be described in detail with reference to FIGS. 1 and 2.

A combustion oscillation estimating apparatus 100 according to an embodiment of the present invention estimates combustion oscillation in a combustion chamber 10 of a boiler shown in FIG. 2. Specifically, the combustion oscillation estimating apparatus 100 detects pressures during injection of flames in the combustion chamber 10 to estimate a resonance and thermoacoustic instability. The combustion oscillation estimating apparatus 100 includes an input unit 110 and a control unit 120.

The input unit 110 is a means receiving one or more data. The data includes an inlet pressure $P_0$ and an inlet velocity $U_0$ at a burner 20 connected to the combustion chamber 10. In addition, the input unit 110 may further receive data for calculating an eigenvalue of a transfer matrix to be described later. Such data includes shape-related data from the burner 20 to the combustion chamber 10, temperature-related data in the combustion chamber 10, and shape-related data of a flame 30.

The data forming the basis for calculating the eigenvalue of the transfer matrix will be described below in more detail with reference to FIG. 2. First, the shape-related data from the burner 20 to the combustion chamber 10 includes shapes derived by dividing a space from the burner 20 to the combustion chamber 10 into a plurality of space lattices. In this case, the plural space lattices may be determined by a CFD (Computational Fluid Dynamics) and have an irregular distance. The shape-related data from the burner 20 to the combustion chamber 10 includes shape-related data of the burner 20, shape change-related data of a connection portion between the burner 20 and the combustion chamber 10, and shape-related data of the combustion chamber 10.

The shape-related data of the burner 20 includes length and width values of the burner 20 in a zone from number 1 to number 3 indicated in FIG. 2. The shape change-related data of the connection portion between the burner 20 and the combustion chamber 10 is data related to a change in cross-sectional areas at number 3 indicated in FIG. 2, and includes a ratio value between a cross-sectional area of the burner 20 and a cross-sectional area of the combustion chamber 10. The shape-related data of the combustion chamber 10 includes length and width values of the combustion chamber 10 in a zone from number 3 or number 4 indicated in FIG. 2 to the end of the combustion chamber 10, namely number 9.

The temperature-related data in the combustion chamber 10 includes a temperature gradient value in a flame reaction zone (from number 3 to number 4 indicated in FIG. 2). The temperature gradient value a value derived through a CFD analysis with respect to the combustion chamber 10.

The shape-related data of the flame 30 includes a plurality of flame surface shapes derived along a longitudinal direction of the flame (namely, an injection direction of the flame). A flame surface is a shape of the flame derived assuming the flame 30 at the associated position is a surface having a thin thickness. The number of flame surfaces is determined to be varied according to a length of the flame 30 and a length of the combustion chamber 10. The length of the flame 30 is determined by factors such as an amount and velocity of fuel supplied to the burner 20.

The input unit 110 may be a known input means such as a keyboard, a key pad, a mouse, a dome switch, or a touch pad.

The control unit 120 receives the data from the input unit and detects a pressure in the combustion chamber 10 based on a shape from the burner 20 to the combustion chamber 10, a temperature distribution in the combustion chamber 10, and a shape of the flame 30. Specifically, the control unit 120 detects a pressure during combustion oscillation in the combustion chamber 10 through an eigenvalue problem by means of using a plurality of transfer matrices having an eigenvalue calculated based on the above-mentioned each data.

Specifically, the plural transfer matrices include a burner shape transfer matrix $T_{Burner\ Duct}$ (hereinafter, referred to as "$T_B$") based on the shape-related data of the burner 20, a shape change transfer matrix $T_{Area\ Change}$ (hereinafter, referred to as "$T_A$") based on the shape change-related data of the connection portion between the burner 20 and the combustion chamber 10, a combustion chamber shape transfer matrix $T_{Furnance\ Duct}$ (hereinafter, referred to as "$T_F$") based on the shape-related data of the combustion chamber 10, a temperature distribution transfer matrix $T_{Flame\ Reaction\ Zone}$ (hereinafter, referred to as "$T_{FR}$") based on the temperature distribution-related data in the combustion chamber 10, and a flame shape transfer matrix $T_{Flame\ Model}$ (hereinafter, referred to as "$T_{FM}$") based on the shape-related data of the flame 30.

The control unit 120 analyzes an eigenvalue problem with respect to a global matrix which sets the plural transfer matrices as diagonal elements. The global matrix To is a matrix made by diagonally arranging the burner shape transfer matrix $T_B$, the shape change transfer matrix $T_A$, the temperature distribution transfer matrix $T_{FR}$, the flame shape transfer matrix $T_{FM}$, and the combustion chamber shape transfer matrix $T_F$ in the listed order, and summing them, as indicated by the following equation 1.

$$[T]_0 = \begin{bmatrix} [T_B] & & & & \\ & [T_A] & & & \\ & & [T_{FR}] & & \\ & & & [T_{FM}] & \\ & & & & [T_F] \end{bmatrix} \qquad \text{[Equation 1]}$$

The control unit 120 detects a pressure $P_1$ in the combustion chamber 10 by analyzing the eigenvalue problem with respect to the global matrix To, which sets variable data such as a pressure $P_0$ and a velocity $U_0$ at an inlet end of the burner 20 as input values, as indicated by the following equation 2.

$$\begin{bmatrix} P_1 \\ U_1 \end{bmatrix} = [T]_0 \begin{bmatrix} P_0 \\ U_0 \end{bmatrix} \qquad \text{[Equation 2]}$$

In terms of the above-mentioned configuration, since the control unit 120 analyzes the eigenvalue problem using one global matrix to detect the pressure $P_1$ in the combustion chamber 10, it may be possible to simultaneously estimate status of amplitude of combustion oscillation frequencies and instability in the combustion chamber 10.

In addition, in terms of the above-mentioned configuration, since the control unit estimates combustion oscillation using the global matrix made by summing all of the transfer matrix based on values of the widths as well as the shapes and lengths of the burner and the combustion chamber, the transfer matrix based on values of the temperature distribution and temperature gradient in the combustion chamber, and the transfer matrix based on the flame shape, it may be possible to improve estimation accuracy of the combustion oscillation.

Figure 3:
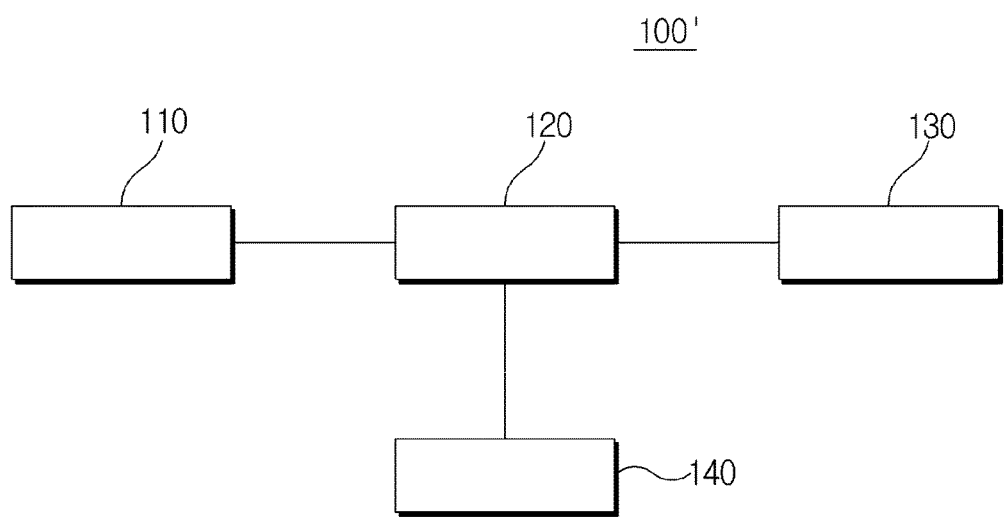
FIG. 3 is a block diagram illustrating a combustion oscillation estimating apparatus according to another embodiment of the present invention.

FIG. 3 is a block diagram illustrating a combustion oscillation estimating apparatus according to another embodiment of the present invention. A combustion oscillation estimating apparatus 100' according to another embodiment of the present invention further includes a storage unit 130 and a display unit 140, together with the above-mentioned input unit 110 and control unit 120.

The storage unit 130 stores the above-mentioned transfer matrices and global matrix. In addition, the storage unit 130 may also store the above-mentioned variable data and eigenvalue data. The storage unit 130 may be built in or equipped outside the apparatus, and may be a known storage medium. For example, the storage unit 130 may include a flash memory, a hard disk type memory, a multimedia card macro type memory, a card type memory such as an SD or XD memory, RAM, SRAM, ROM, a magnetic memory, and a storage medium such as a magnetic disk or an optical disk. However, the storage unit 130 is not limited thereto, but may be any storage means for storing data.

The display unit 140 is a means for visually displaying the variable data and eigenvalue data input to the input unit 110 and various types of information and results processed by the control unit 120. The display unit 140 may be a known display means such as an LCD (Liquid Crystal Display), a TFT (Thin Film Transistor) LCD, or an OLED (Organic Light Emitting Diode). However, the display unit 140 is not limited thereto, but may be any means for displaying the input various data and processed information.

Figure 4:
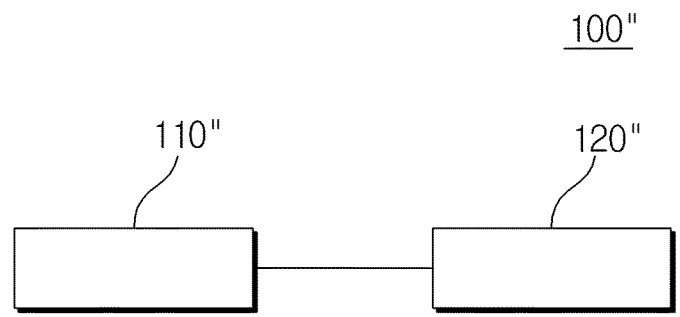
FIG. 4 is a block diagram illustrating a combustion oscillation estimating apparatus according to a further embodiment of the present invention.
Figure 5:
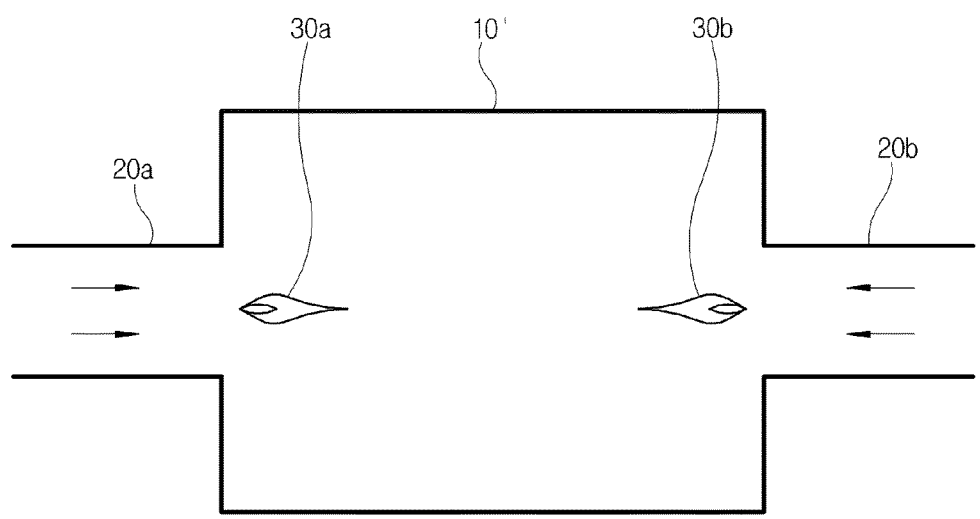
FIG. 5 is a conceptual diagram illustrating a plurality of burners and a combustion chamber to which the embodiment shown in FIG. 4 is applicable.

FIG. 4 is a block diagram illustrating a combustion oscillation estimating apparatus according to a further embodiment of the present invention. FIG. 5 is a conceptual diagram illustrating a plurality of burners and a combustion chamber to which the embodiment shown in FIG. 4 is applicable. Hereinafter, a combustion oscillation estimating apparatus 100" according to a further embodiment of the present invention will be described in detail with reference to FIGS. 4 and 5.

The combustion oscillation estimating apparatus 100" according to the further embodiment of the present invention estimates combustion oscillation in a combustion chamber 10' of a boiler shown in FIG. 4. The combustion chamber 10' is connected with two individual burners 20a and 20b facing each other so as to inject flames. The combustion oscillation estimating apparatus 100" detects pressures during injection of flames in the combustion chamber 10' to estimate a resonance and thermoacoustic instability. The combustion oscillation estimating apparatus 100" includes an input unit 110" and a control unit 120".

As described above, the input unit 110" is a means receiving one or more data. The data includes an inlet pressure and an inlet velocity at respective first and second burners 20a and 20b connected to the combustion chamber 10'.

In addition, the input unit 110" may further receive data for calculating an eigenvalue of a transfer matrix to be described later. Such data includes shape-related data from the first burner 20a to the combustion chamber 10', shape-related data from the second burner 20b to the combustion chamber 10', temperature-related data in the combustion chamber 10', shape-related data of flames 30a and 30b, etc. The data is input to each of the first and second burners 20a and 20b. Since these are similar to those described with reference to FIG. 2, no description will be given thereof.

The control unit 120" detects a pressure in the combustion chamber 10' based on a shape from each of the burners 20a and 20b to the combustion chamber 10', a temperature distribution in the combustion chamber 10', and shapes of the flames 30a and 30b. Specifically, the control unit 120" detects a pressure during combustion oscillation in the combustion chamber 10' through an eigenvalue problem by means of using a plurality of transfer matrices having an eigenvalue calculated based on the above-mentioned each data.

Specifically, the plural transfer matrices, as described above, include a burner shape transfer matrix $T_{Burner\ Duct}$ (hereinafter, referred to as "$T_B$") based on the shape-related data of the burners 20a and 20b, a shape change transfer matrix $T_{Area\ Change}$ (hereinafter, referred to as "$T_A$") based on the shape change-related data of the connection portions between the respective burners 20a and 20b and the combustion chamber 10', a combustion chamber shape transfer matrix $T_{Furnance\ Duct}$ (hereinafter, referred to as "$T_F$") based on the shape-related data of the combustion chamber 10', a temperature distribution transfer matrix $T_{Flame\ Reaction\ Zone}$ (hereinafter, referred to as "$T_{FR}$") based on the temperature distribution-related data in the combustion chamber 10', and a flame shape transfer matrix $T_{Flame\ Model}$ (hereinafter, referred to as "$T_{FM}$") based on the shape-related data of the flames 30a and 30b.

Similarly to the above control unit 120, the control unit 120" according to the present embodiment analyzes an eigenvalue problem with respect to a global matrix which sets the plural transfer matrices as diagonal elements. However, the global matrix Top used in the control unit 120" of the present embodiment is a matrix made by summing a group T1 of a plurality of transfer matrices related to the first burner 20a and a group T2 of a plurality of transfer matrices related to the second burner 20b and setting the combustion chamber shape transfer matrix as a common transfer matrix, as indicated by the following equation 3.

[Equation 3]

$$[T]_{op} = \begin{bmatrix} [T_B] & & & & & & \\ & [T_A] & & & T1 & & \\ & & [T_{FR}] & & & T1 & \\ & & & [T_{FM}] & & & \\ & & & & [T_F] & & \\ & & & & & [T_{FM}] & \\ & & & & & [T_{FR}] & \\ & & & & & & [T_A] \\ & & & & & & [T_B] \end{bmatrix}$$

In [Equation 3], the group of a plurality of transfer matrices related to the first burner 20a is indicated as "T1" and the group of a plurality of transfer matrices related to the second burner 20b is indicated as "T2".

The group T1 of a plurality of transfer matrices related to the first burner 20a is diagonally arranged in the same order as the global matrix To used in the control unit 120 according to the above-mentioned embodiment. On the other hand, the group T2 of a plurality of transfer matrices related to the second burner 20b is diagonally arranged in the reverse order to the above-mentioned global matrix To.

That is, the global matrix Top of the present embodiment is a matrix made by sequentially summing all of the transfer matrices based on each data from the first burner 20a via the combustion chamber 10' to the second burner 20b. Hereinafter, the flame injected by the first burner 20a is defined as a first flame 30a and the flame injected by the second burner 20b is defined as a second flame 30b.

Specifically, the global matrix Top of the present embodiment is a matrix made by sequentially and diagonally arranging and summing the transfer matrices respectively based on the shape-related data of the first burner 20a, the shape change-related data of the connection portion between the first burner 20a and the combustion chamber 10', the temperature distribution-related data in a reaction zone of the first flame 30a of the combustion chamber 10', the shape-related data of the first flame 30a, the shape-related data of the combustion chamber 10', the shape-related data of the second flame 30b, the temperature distribution-related data in a reaction zone of the second flame 30b of the combustion chamber 10', the shape change-related data of the connection portion between the second burner 20b and the combustion chamber 10', and the shape-related data of the second burner 20b.

In this case, since the above data is similar to the data of the embodiment described with reference to FIGS. 1 and 2, no detailed description will be given thereof.

Similarly to the above-mentioned [Equation 2], the control unit 120" detects pressures in the combustion chamber 10' by analyzing the eigenvalue problem with respect to the global matrix Top which sets data such as a pressure and a velocity at an inlet end of each of the burners 20a and 20b as input values.

In terms of the above-mentioned configuration, since the control unit analyzes the eigenvalue problem using one global matrix even in combustion chamber provided with the plural burners as shown in FIG. 5, it may be possible to simply estimate combustion oscillation.

In a still further embodiment of the present invention, the above combustion oscillation estimating apparatus 100" may further include storage unit and a display unit.

The storage unit stores the global matrix and individual transfer matrices according to [Equation 3] in addition to the above data and analyzed results of the eigenvalue problem. Since specific configurations and functions of the storage unit are similar to those of the storage unit 130 described with reference to FIG. 3, no description will be given thereof.

The display unit is a means for visually displaying the data input to the input unit 110" and various types of information and results processed by the control unit 120". Since specific configurations and functions of the display unit are similar to those of the display unit 140 described with reference to FIG. 3, no description will be given thereof.

Figure 6:
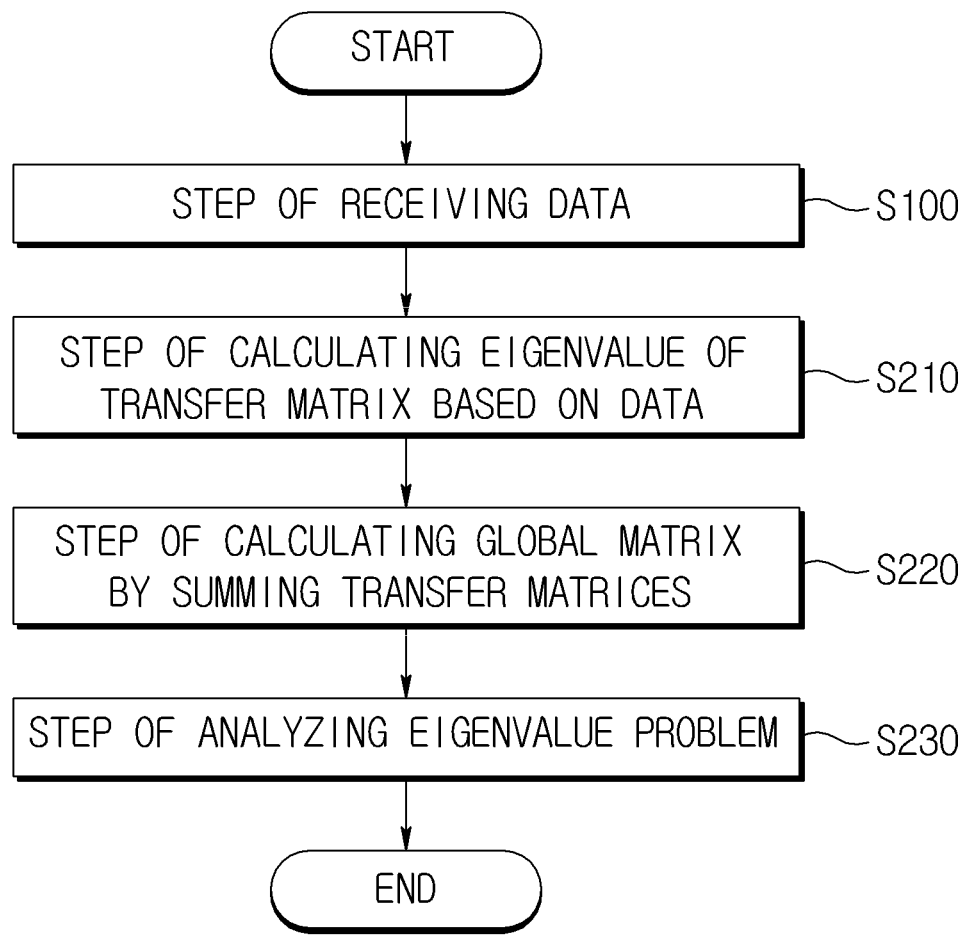
FIG. 6 is a flowchart illustrating a combustion oscillation estimating method according to an embodiment of the present invention.

FIG. 6 is a flowchart illustrating a combustion oscillation estimating method according to an embodiment of the present invention. The flow chart represented in FIG. 6 represents an executable program logic for the control unit 120 to perform control. Hereinafter, a method of estimating combustion oscillation using the combustion oscillation estimating apparatus according to the above embodiments will be described in detail with reference to FIGS. 1 to 6.

A combustion oscillation estimating method according to an embodiment of the present invention includes a step S100 of receiving data by input units 110 and 110" and steps S210, S220, and S230 of detecting pressures in combustion chambers 10 and 10' based on the data by control units 120 and 120".

The step S100 of receiving data by input units is a step in which the above-mentioned various data is input to the input units 110 and 110". Since this is similar to that described with reference to FIGS. 1 to 5, no description will be given thereof.

The steps of detecting pressures in combustion chambers based on the data by control units include a step S210 of calculating an eigenvalue of a transfer matrix, a step S220 of calculating a global matrix, and a step S230 of analyzing an eigenvalue problem.

The step S210 of calculating an eigenvalue of a transfer matrix is a step in which the control units 120 and 120" estimate the eigenvalue of the transfer matrix based on each data in the order from a burner to a combustion chamber or from the burner via the combustion chamber to another burner. Since this is similar to that described with reference to FIGS. 1 to 5, no description will be given thereof.

The step S220 of calculating a global matrix is a step in which the control units 120 and 120" calculate the global matrix which sets the transfer matrix as the diagonal element based on each data. Since this is similar to that described with reference to FIGS. 1 to 5, no description will be given thereof.

The step S230 of analyzing an eigenvalue problem is a step in which the control units 120 and 120" detect pressures in the combustion chamber using the global matrix through the known eigenvalue problem analysis method. Since this is similar to that described with reference to FIGS. 1 to 5, no description will be given thereof.

As is apparent from the above description, in accordance with embodiments of the present invention, since burner and combustion chamber shapes are reflected approximately to actual shapes and a flame shape is also reflected, it may be possible to improve estimation accuracy of combustion oscillation.

In addition, in accordance with the embodiments of the present invention, since a transfer matrix calculating an eigenvalue based on burner and combustion chamber shapes, a temperature distribution, and a flame shape is used, it may be possible to improve estimation accuracy of combustion oscillation.

In addition, in accordance with the embodiments of the present invention, since a plurality of transfer matrices calculating an eigenvalue based on burner and combustion chamber shapes, a temperature distribution, and a flame shape is used, it may be possible to together estimate resonance status of combustion oscillation in a combustion chamber and thermoacoustic instability.

In addition, in accordance with the embodiments of the present invention, since pressures are simultaneously detected by summing transfer matrices which are respectively related to a plurality of burners, it may be possible to simply estimate combustion oscillation even in the combustion chamber connected with the plural burners.

While the present invention has been described with respect to the specific embodiments, it will be apparent to those skilled in the art that various changes and modifications may be made without departing from the spirit and scope of the invention as defined in the following claims.

What is claimed is:

1. A combustion oscillation estimating apparatus configured to estimate combustion oscillation in a combustion chamber connected with a burner, wherein a flame is injected by the burner, comprising:
    a connection portion between an outlet end of the burner and the combustion chamber;
    an input unit configured to receive data comprising an inlet pressure of the burner;

a control unit configured to receive the data from the input unit, calculate a pressure in the combustion chamber based on a shape from the burner to the combustion chamber, a temperature distribution in the combustion chamber, and a shape of the flame, and estimate an amplitude of a combustion oscillation of the combustion chamber based on the pressure calculated, and determine improve in estimation accuracy of the combustion oscillation in the combustion chamber based on the pressure calculated, wherein the shape from the burner to the combustion chamber is determined based on sequential cross-sections taken along a longitudinal direction from the burner to a zone in the combustion chamber comprising the flame;

wherein the temperature distribution in the combustion chamber is determined based on a temperature gradient value in the zone in the combustion chamber comprising the flame; and wherein the control unit is further configured to provide the calculated pressure of the combustion chamber, the shape of the burner, the temperature distribution and the shape of the flame to a display unit for visual display.

2. The combustion oscillation estimating apparatus according to claim 1, wherein the control unit calculates the pressure in the combustion chamber using a transfer matrix having an eigenvalue calculated based on one of: shape-related data from the burner to the combustion chamber, temperature distribution-related data in the combustion chamber, and shape-related data of the flame.

3. The combustion oscillation estimating apparatus according to claim 2, further comprising a storage unit for storing the transfer matrix.

4. The combustion oscillation estimating apparatus according to claim 2, wherein the data received by the input unit further comprises at least one of the shape-related data from the burner to the combustion chamber, the temperature distribution-related data in the combustion chamber, and the shape-related data of the flame.

5. The combustion oscillation estimating apparatus according to claim 2, wherein the shape-related data from the burner to the combustion chamber comprises at least one of shape-related data of the burner, shape change-related data of the connection portion between the burner and the combustion chamber, and shape-related data of the combustion chamber.

6. The combustion oscillation estimating apparatus according to claim 5, wherein the control unit calculates the pressure in the combustion chamber using a global matrix made by summing a burner shape transfer matrix based on the shape-related data of the burner, a shape change transfer matrix based on the shape change-related data of the connection portion between the burner and the combustion chamber, a combustion chamber shape transfer matrix based on the shape-related data of the combustion chamber, a temperature distribution transfer matrix based on the temperature distribution-related data in the combustion chamber, and a flame shape transfer matrix based on the shape-related data of the flame.

7. The combustion oscillation estimating apparatus according to claim 6, wherein the global matrix is a matrix made by summing the burner shape transfer matrix, the shape change transfer matrix, the temperature distribution transfer matrix, the flame shape transfer matrix, and the combustion chamber shape transfer matrix in the listed order.

8. The combustion oscillation estimating apparatus according to claim 5, wherein the shape change-related data of the connection portion between the burner and the combustion chamber comprises a ratio between a cross-sectional area at the outlet end of the burner and a cross-sectional area of the combustion chamber.

9. The combustion oscillation estimating apparatus according to claim 2, wherein the temperature distribution-related data in the combustion chamber comprises a temperature gradient in the combustion chamber.

10. The combustion oscillation estimating apparatus according to claim 9, wherein the temperature gradient is calculated through a CFD (Computational Fluid Dynamics).

11. The combustion oscillation estimating apparatus according to claim 2, wherein the shape-related data of the flame is based on a plurality of flame surfaces derived along a longitudinal direction of the flame.

12. A combustion oscillation estimating apparatus configured to estimate combustion oscillation in a combustion chamber connected with a plurality of burners wherein flames are respectively injected by the burners, comprising:

a connection portion between an outlet end of the burner and the combustion chamber;

an input unit configured to receive data comprising inlet pressures of the burners;

a control unit configured to receive the data from the input unit, calculate a pressure in the combustion chamber based on a shape from the burners to the combustion chamber, a temperature distribution in the combustion chamber, and a shape of each of the flames, estimate an amplitude of a combustion oscillation of the combustion chamber based on the pressure calculated, and determine improve in estimation accuracy of the combustion oscillation in the combustion chamber based on the pressure calculated, wherein the shape from the burners to the combustion chamber is determined based on sequential cross-sections taken along a longitudinal direction from the burners to a zone in the combustion chamber comprising the flame;

wherein the temperature distribution in the combustion chamber is determined based on a temperature gradient value in the zone in the combustion chamber comprising the flame; and wherein the control unit is further configured to provide the pressure of the combustion chamber, the shape of the burner, the temperature distribution and the shape of the flame to a display unit for visual display.

13. The combustion oscillation estimating apparatus according to claim 12, wherein the control unit calculates the pressure in the combustion chamber using a transfer matrix having an eigenvalue calculated based on one of shape-related data from each of the burners to the combustion chamber, temperature distribution-related data in the combustion chamber, and shape-related data of the flame injected into the combustion chamber by the associated burner.

14. The combustion oscillation estimating apparatus according to claim 13, wherein the control unit calculates the pressure in the combustion chamber using a global matrix made by summing transfer matrices having an eigenvalue calculated based on the associated data in the order from one burner via the combustion chamber to another burner.

15. The combustion oscillation estimating apparatus according to claim 14, wherein:

the burners comprise a first burner and a second burner which face each other and are each connected to the combustion chamber;

the connection portion comprises a first connection portion and a second connection portion; and the global matrix is a matrix made by summing a first burner shape transfer matrix based on shape-related data of the first burner, a first shape change transfer matrix based on shape change-related data of a first connection portion between the first burner and the combustion chamber, a first temperature distribution transfer matrix based on the temperature distribution-related data in the combustion chamber by the flame injected by the first burner, a first flame shape transfer matrix based on the shape-related data of the flame injected by the first burner, a combustion chamber shape transfer matrix based on the shape-related data of the combustion chamber, a second flame shape transfer matrix based on the shape-related data of the flame injected by the second burner, a second temperature distribution transfer matrix based on the temperature distribution-related data in the combustion chamber by the flame injected by the second burner, a second shape change transfer matrix based on shape change-related data of a second connection portion between the second burner and the combustion chamber, and a second burner shape transfer matrix based on shape-related data of the second burner, in the listed order.

16. The combustion oscillation estimating apparatus according to claim 15, wherein:

the shape change-related data of the first or second connection portion between the first or second burner and the combustion chamber comprises a ratio between a cross-sectional area at the outlet end of the first or second burner and a cross-sectional area of the combustion chamber taken along a longitudinal direction of the first or second burner and the combustion chamber;

the temperature distribution-related data in the combustion chamber by the flame injected by the first or second burner comprises a temperature gradient in the combustion chamber; and the shape-related data of the flame injected by the first or second burner is based on a plurality of flame surfaces derived along a longitudinal direction of the associated flame.

17. A combustion oscillation estimating method comprising:

receiving data by an input unit;

calculating a pressure, by a control unit, in a combustion chamber based on the data received by the input unit; and estimating an amplitude of a combustion oscillation of the combustion chamber based on the pressure calculated, and determining improve in estimation accuracy of the combustion oscillation in the combustion chamber based on the pressure calculated, wherein a connection portion is disposed between an outlet area of the burner and the combustion chamber, wherein the data comprises a shape-related data from the burner to the combustion chamber, temperature distribution-related data in the combustion chamber, and shape-related data of a flame injected into the combustion chamber by the burner, wherein the shape-related data is determined based on sequential cross-sections taken along a longitudinal direction from the burner to a zone in the combustion chamber comprising the flame, and wherein the temperature distribution-related data in the combustion chamber is determined based on a temperature gradient value in the zone in the combustion chamber comprising the flame.

18. The combustion oscillation estimating method according to claim 17, wherein the calculating the pressure in the combustion chamber comprises calculating an eigenvalue of a transfer matrix based on the data by the control unit.

19. The combustion oscillation estimating method according to claim 18, wherein the calculating the eigenvalue of the transfer matrix calculates the eigenvalue of the transfer matrix for each data, wherein the calculating the pressure in the combustion chamber further comprises:

calculating a global matrix by summing a plurality of transfer matrices calculated for each data by the control unit; and analyzing an eigenvalue problem with respect to the global matrix by the control unit.

20. The combustion oscillation estimating method according to claim 19, wherein the calculating the global matrix diagonally arranges the plural transfer matrices according to data on which the transfer matrices are based so as to sum them, and sequentially arranges, according to a sequential position from the burner to the combustion chamber, the transfer matrices based on data corresponding to the position.

* * * * *